(12) United States Patent
Friedlander et al.

(10) Patent No.: US 7,383,366 B2
(45) Date of Patent: Jun. 3, 2008

(54) KEYPAD USER INTERFACE AND PORT SEQUENCE MAPPING ALGORITHM

(75) Inventors: Jeremy Friedlander, Austin, TX (US); Roger Borchers, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 11/315,047

(22) Filed: Dec. 22, 2005

(65) Prior Publication Data

US 2007/0162861 A1 Jul. 12, 2007

(51) Int. Cl.
*G06F 13/14* (2006.01)
*H04L 9/32* (2006.01)

(52) U.S. Cl. .............................. 710/62; 709/227; 726/3; 726/26; 713/161

(58) Field of Classification Search ............ None
See application file for complete search history.

(56) References Cited

OTHER PUBLICATIONS www. http://www.portknocking.org/view/implementations "Implementations—A Wide Variety of Implementations of Port Knocking are . . . Knocking About" Jan. 4, 2005 (7 pages).

*Primary Examiner*—Ilwoo Park
(74) *Attorney, Agent, or Firm*—Hamilton & Terrile, LLP; Stephen A. Terrile

(57) ABSTRACT

A method of generating a port knocking sequence which includes providing a port knocking user interface which allows a user to enter an input string, mapping the input string received via the port knocking user interface to a corresponding port knocking sequence, and generating the corresponding port knocking sequence which is sent to a target system is disclosed.

14 Claims, 5 Drawing Sheets

KEYPAD USER INTERFACE AND PORT SEQUENCE MAPPING ALGORITHM

BACKGROUND OF THE INVENTION

1. Field of the Invention

The present invention relates to information handling systems and more particularly to the use of port knocking in information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue relating to information handling systems is how multiple information handling systems can efficiently and safely communicate. When communicating, information handling systems can be configured to respond to requests on open networking ports. However, having the open port allows for malicious entities to detect the existence of the system through exhaustive port scanning, and subsequently launch an exhaustive authentication attack on the open port. Because of this possible security threat, it is desirable for systems to be configured to have all networking ports closed with the help of firewall technologies. Closing the network ports can prevent other systems from creating network connections to that system, as any attempt to connect will fail as no ports are set to respond. While this blocks malicious connection attempts, such a method also prevents valid connection attempts from trusted systems from gaining access via the port.

One known method of addressing this challenge is port knocking. Port provides a method of authentication that works while all networking ports are closed at the time of the remote login attempt. The authentication is provided by having the remote system attempt to connect, or knock, on the closed ports of the target system in a particular pre-determined sequence. The target system can monitor these port knocks via standard logs generated by the firewall technology, and if the pre-determined sequence is recognized, the target system allows a connection by the remote system. The probability of an attacker generating the correct knock sequence is very low assuming the sequence length is sufficient.

While port knocking represents a valuable technology, currently its use is relatively limited. One reason for the relatively limited use of port knocking is a lack of a simple user interface. With known port knocking techniques, users need a script on the remote system that performs the knocks and monitoring software on the target system interpreting the firewall logs to recognize the incoming knock sequence and perform the appropriate action.

It would be desirable to provide a user friendly interface for using port knocking technology.

SUMMARY OF THE INVENTION

In accordance with the present invention, a user friendly interface for using port knocking technology is disclosed. More specifically, a port knocking abstraction is provided which enables users to provide a simple interaction with a mapping module. The mapping module then performs the steps necessary to generate the appropriate knock sequence on the target system. The simple interaction then causes the mapping module to generate the port knocking sequence. This mapping module also provides two-way function so that the target system, when logging the incoming port knocking sequence, maps the port sequence to the simple interaction, thus allowing the administrator of the target system to use the same user friendly interface to identify allowed systems (i.e., systems which may have access via port knocking). Such a system provides a simple method for providing access to port knocking technology.

In one embodiment, the user interface is presented as a keypad user interface in which a user would enter a predetermined code. This would serve to abstract the actual port calls via an interface that looks like a phone keypad. The numbers entered via the keypad are mapped to a port knocking sequence via a mapping algorithm. This mapping algorithm may also be used as a two-way function so that the target system, when logging the incoming port knocking sequence, can map the port sequence to the originating numerical value, thus allowing an administrator of the target system to use the same user friendly keypad to identify allowed systems.

In another embodiment, the invention relates to a method of generating a port knocking sequence which includes providing a port knocking user interface which allows a user to enter an input string, mapping the input string received via the port knocking user interface to a corresponding port knocking sequence, and generating the corresponding port knocking sequence which is sent to a target system.

In another embodiment, the invention relates to a port knocking environment which includes a remote system. The remote system includes a processor, a memory coupled to the processor and an input/output device. The memory includes a port knocking user interface and a port knocking mapping module. The port knocking user interface allows a user to enter an input string. The mapping module maps the input string received via the port knocking user interface to a corresponding port knocking sequence. The input/output device generates the corresponding port knocking sequence which is sent to a target system.

In another embodiment, the invention relates to an apparatus for generating a port knocking sequence which includes means for providing a port knocking user interface which allows a user to enter an input string, means for mapping the input string received via the port knocking user interface to a corresponding port knocking sequence, and means for generating the corresponding port knocking sequence which is sent to a target system.

BRIEF DESCRIPTION OF THE DRAWINGS

The present invention may be better understood, and its numerous objects, features and advantages made apparent to those skilled in the art by referencing the accompanying

DETAILED DESCRIPTION

Figure 1:
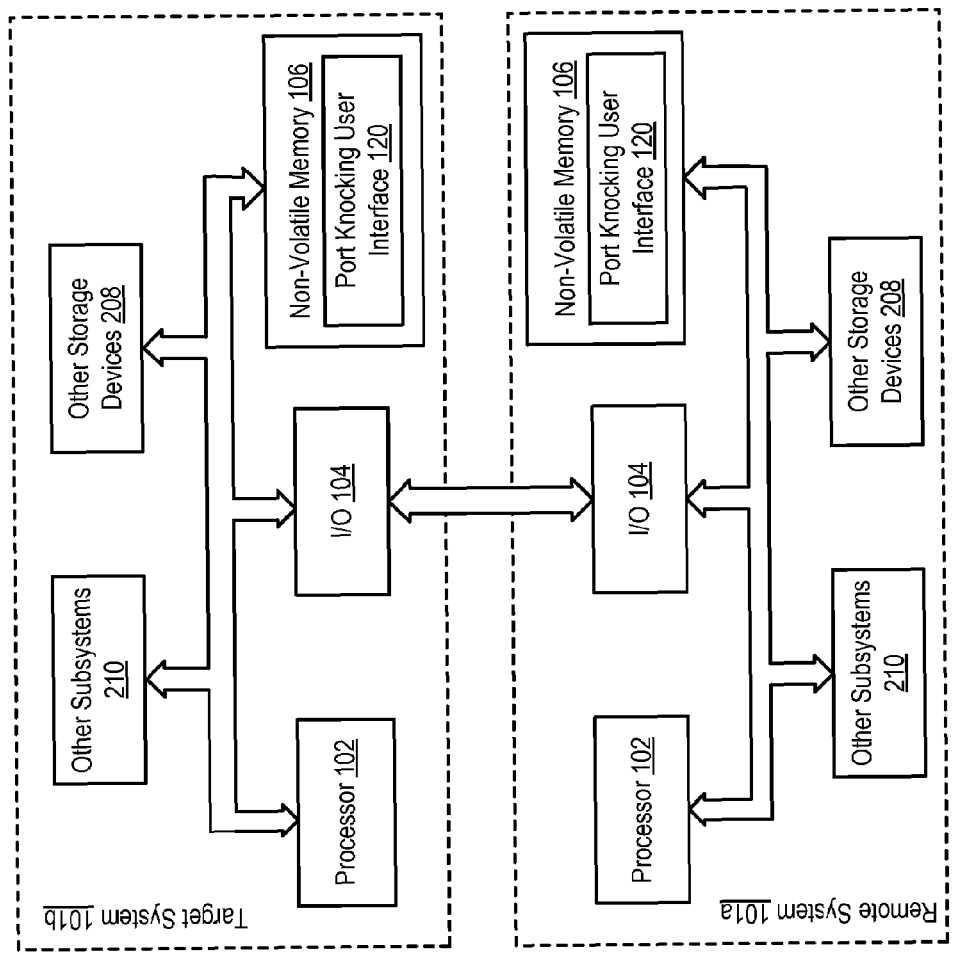
FIG. 1 shows a block diagram of a port knocking environment.

Referring to FIG. 1, a block diagram of port knocking environment 100 is shown. The port knocking environment 100 includes a plurality of information handling systems 101 which function as a remote system 101a and a target system 101b. Each information handling system 101 includes a processor 102, input/output (I/O) devices 104, such as a display, a keyboard, a mouse, and associated controllers, non volatile memory 106 such as a hard disk drive, and other storage devices 108, such as a floppy disk and drive and other memory devices, and various other subsystems 110, all interconnected via one or more buses 112. Additionally, the non-volatile memory 120 includes a port knocking user interface 120. The I/O devices 104 may also include a communication interface such as a network controller along with associated firewalls.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
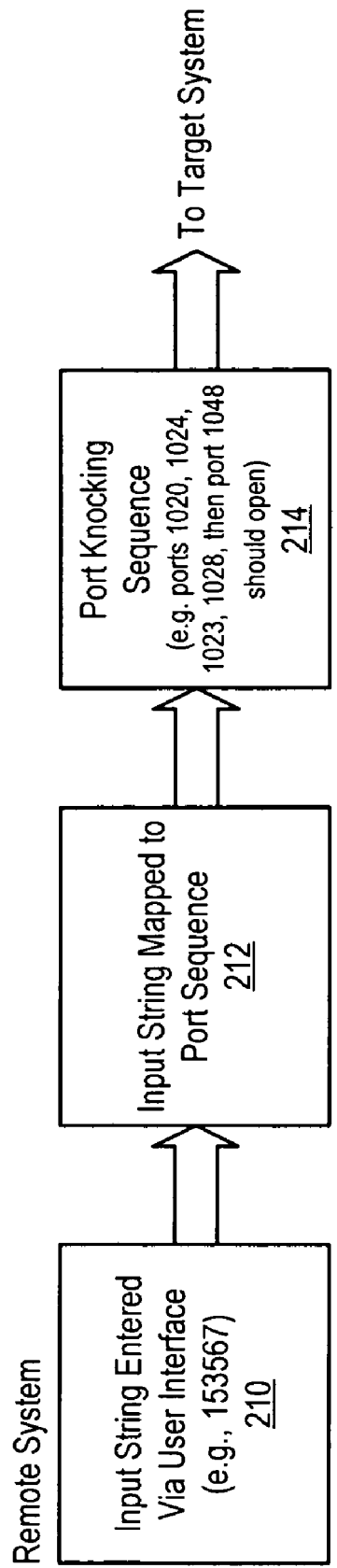
FIG. 2 shows a functional diagram of the operation of a remote system of the port knocking environment.

Referring to FIG. 2, a functional diagram of the operation of the remote system 101a of the port knocking environment 100 is shown. More specifically, an input string is provided to a port knocking user interface at step 210. The input string may be entered via, e.g., a password text box. The port knocking interface then access a mapping module which maps the input string to a corresponding port sequence at step 212. The remote system 101a then generates the accesses to the target system 101b using the port knocking sequence that is identified by the mapping module at step 214.

Figure 3:
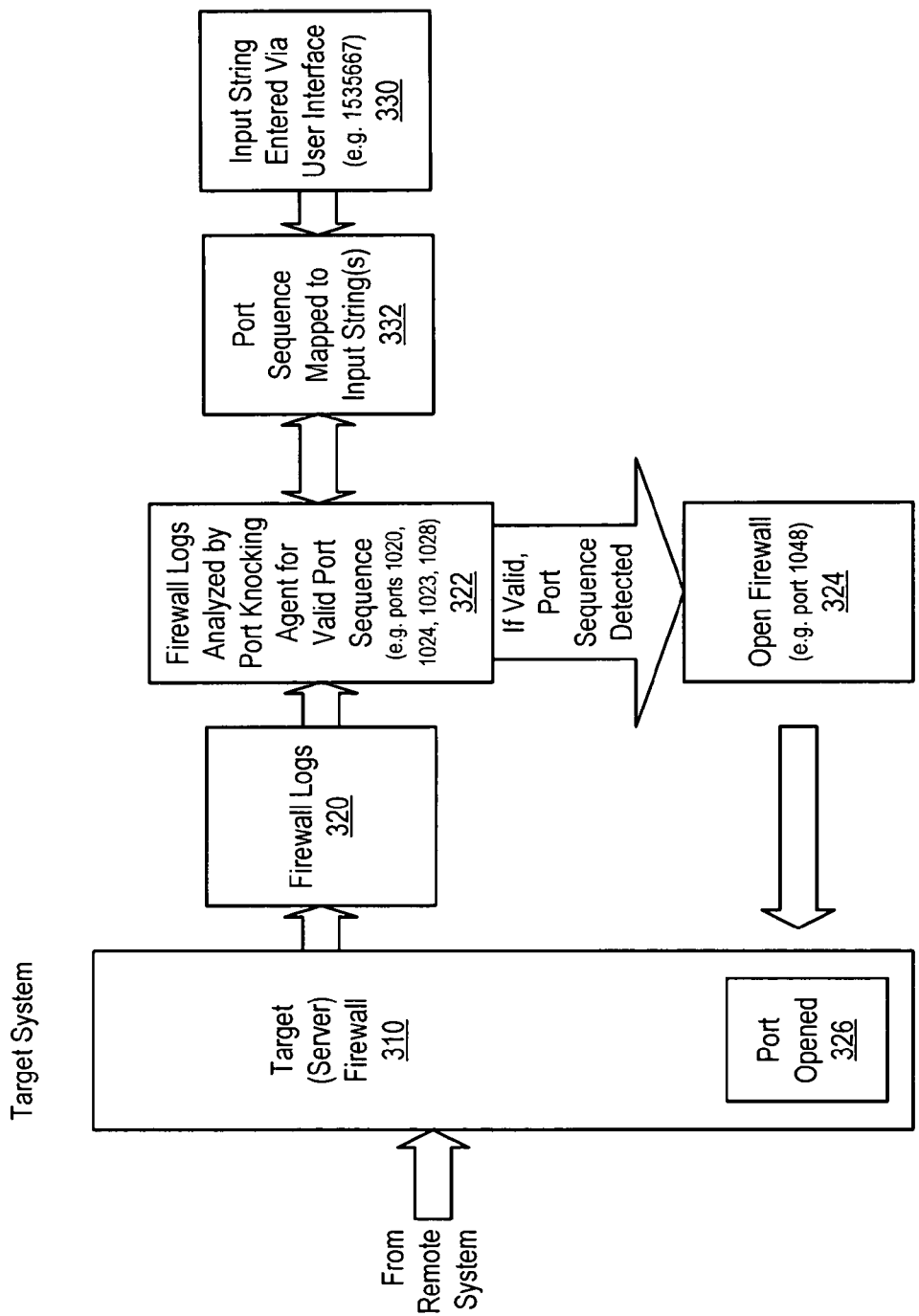
FIG. 3 shows a functional diagram of the operation of a target system of the port knocking environment.

Referring to FIG. 3, a functional diagram of the operation of the target system 101b of the port knocking environment 100 is shown. More specifically, the port knocks that are generated by the remote system 101a access the firewall 310 of the remote system 101b. The firewall 310 logs the access attempts at step 320. Next the firewall logs are analyzed by a port knocking agent to determine whether a valid port knocking sequence has been received at step 322. If a valid port knocking sequence is received, then the port knocking agent causes the firewall to open a port at step 324 and the port is opened at step 326.

The remote system 101b also includes a port knocking user interface via which an administrator may enter an input string at step 330 to allow the administrator to access the port sequence that is mapped to the input string at step 332. The input string may be entered via, e.g., a password text box.

Other embodiments are within the following claims.

Figure 4:
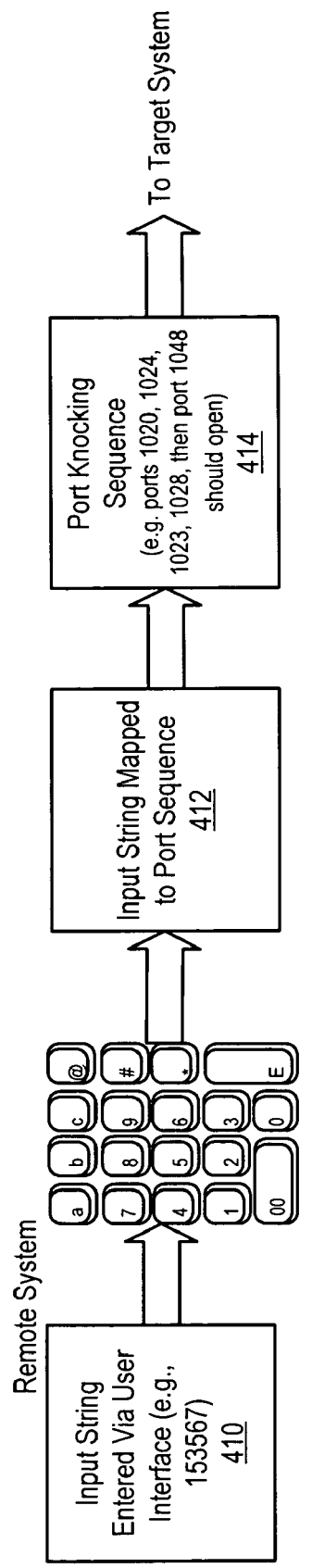
FIG. 4 shows a functional diagram of the operation of an alternate remote system of the port knocking environment.
Figure 5:
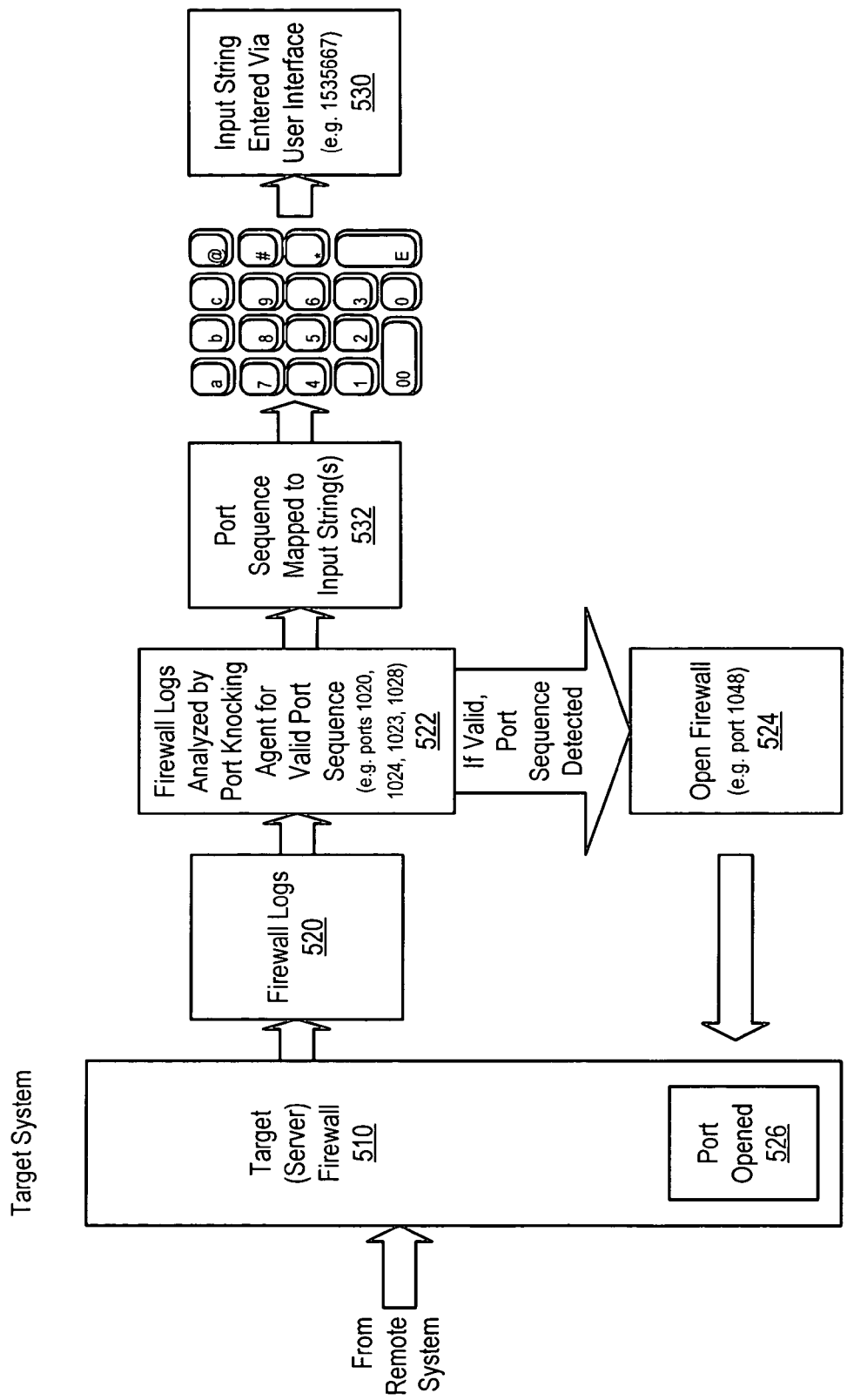
FIG. 5 shows a functional diagram of the operation of an alternate target system of the port knocking environment.

For example, referring to FIGS. 4 and 5 functional diagrams of the operation of an alternate remote system and target system of the port knocking environment are shown. In the alternate port knocking interface, a keypad is displayed via which a user or an administrator may enter the input string. The keypad may be a number pad as shown or any known alpha-numeric type keypad.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method of generating a port knocking sequence comprising:

providing a port knocking user interface, the port knocking user interface allowing a user to enter an input string;

mapping the input string received via the port knocking user interface to a corresponding port knocking sequence; and generating the corresponding port knocking sequence, the corresponding port knocking sequence being sent to a target system.

2. The method of claim 1 further comprising:

providing the target system with a port knocking user interface, the port knocking user interface allowing an administrator to enter an input string;

mapping the input string received via the port knocking user interface to a corresponding port knocking sequence;

accessing the corresponding port knocking sequence to allow the administrator of the target system to identify allowed systems.

3. The method of claim 1 wherein:
the user interface presents a password text block.

4. The method of claim 1 wherein:
the user interface presents a keypad for entering the input string.

5. A port knocking environment comprising:
a remote system, the remote system including
a processor;
a memory coupled to the processor, the memory including a port knocking user interface and a port knocking mapping module, the port knocking user interface allowing a user to enter an input string, the mapping module mapping the input string received via the port knocking user interface to a corresponding port knocking sequence; and,
an input/output device, the input/output device generating the corresponding port knocking sequence, the corresponding port knocking sequence being sent to a target system.

6. The port knocking environment of claim 5 further comprising:
a target system, the target system including
a processor;
a memory coupled to the processor, the memory including a port knocking user interface and a mapping module, the port knocking user interface allowing an administrator to enter an input string, the mapping module mapping the input string received via the port knocking user interface to a corresponding port knocking sequence;
an input/output device, the input output device accessing the corresponding port knocking sequence to allow the administrator of the target system to identify allowed systems.

7. The port knocking environment of claim 5 wherein:
the user interface presents a password text block.

8. The port knocking environment of claim 5 wherein:
the user interface presents a keypad for entering the input string.

9. The port knocking environment of claim 6 wherein:
the input/output device of the target system includes a firewall, the firewall opening a port when a valid port sequence is detected.

10. The port knocking environment of claim 6 wherein:
the firewall logs knocks received by the firewall and,
a port knocking agent analyzes the knocks to identify the valid port sequence.

11. An apparatus for generating a port knocking sequence comprising:
means for providing a port knocking user interface, the port knocking user interface allowing a user to enter an input string;
means for mapping the input string received via the port knocking user interface to a corresponding port knocking sequence
means for generating the corresponding port knocking sequence, the corresponding port knocking sequence being sent to a target system.

12. The apparatus of claim 11 further comprising:
means for providing the target system with a port knocking user interface, the port knocking user interface allowing an administrator to enter an input string;
means for mapping the input string received via the port knocking user interface to a corresponding port knocking sequence;
means for accessing the corresponding port knocking sequence to allow the administrator of the target system to identify allowed systems.

13. The apparatus of claim 11 wherein:
the user interface presents a password text block.

14. The apparatus of claim 11 wherein:
the user interface presents a keypad for entering the input string.

* * * * *